United States Patent
Hamada et al.

(10) Patent No.: US 12,512,973 B2
(45) Date of Patent: Dec. 30, 2025

(54) SECRET MAXIMUM VALUE CALCULATION APPARATUS, METHOD AND PROGRAM

(71) Applicant: NTT, Inc., Tokyo (JP)

(72) Inventors: Koki Hamada, Musashino (JP); Ryo Kikuchi, Musashino (JP)

(73) Assignee: NTT, Inc., Tokyo (JP)

( * ) Notice: Subject to any disclaimer, the term of this patent is extended or adjusted under 35 U.S.C. 154(b) by 628 days.

(21) Appl. No.: 17/791,547

(22) PCT Filed: Jan. 17, 2020

(86) PCT No.: PCT/JP2020/001545
§ 371 (c)(1),
(2) Date: Jul. 8, 2022

(87) PCT Pub. No.: WO2021/144973
PCT Pub. Date: Jul. 22, 2021

(65) Prior Publication Data
US 2023/0033922 A1    Feb. 2, 2023

(51) Int. Cl.
*H04L 29/06* (2006.01)
*G06F 7/544* (2006.01)
*H04L 9/08* (2006.01)

(52) U.S. Cl.
CPC ............ *H04L 9/0861* (2013.01); *G06F 7/544* (2013.01)

(58) Field of Classification Search
None
See application file for complete search history.

(56) References Cited

U.S. PATENT DOCUMENTS

2014/0201126 A1* 7/2014 Zadeh ............... A61B 5/165
  706/52
2015/0215122 A1* 7/2015 Takahashi ......... H04L 9/0852
  380/283

(Continued)

OTHER PUBLICATIONS

Athanasios G. Giannopoulos et al., "Privacy Preserving Medical Data Analytics using Secure Multi Party Computation. An End-to-End Use Case.", Sep. 2018, total 112 pages.

(Continued)

*Primary Examiner* — Eleni A Shiferaw
*Assistant Examiner* — Hassan A Hussein
(74) *Attorney, Agent, or Firm* — XSENSUS LLP

(57) ABSTRACT

A secure maximum value computation apparatus, assuming that a set $X=\{[[x_1]], [[x_2]], \ldots, [[x_n]]\}$, includes an output unit 1 that outputs $[[x_1]]$ and $[[1]]$ as a maximum secret value $[[y]]$ and a flag $[[z(x_1)]]$, respectively, when n=1 holds, a comparison unit 2 that computes a comparison result of which is larger with respect to a predetermined order for each pair $\{[[x_i]], [[x_j]]\} \subset X$ of elements of the X, a flag computation unit 3 that computes whether all comparison results related to each of the $[[x_i]]$s are "large" for each of the $[[x_i]]$s to set a computed value as a flag $[[z(x_i)]]$, and a maximum value computation unit 4 that uses the $[[z(x_i)]]$ to computes a maximum value $[[y]]$.

5 Claims, 7 Drawing Sheets

(56) References Cited

U.S. PATENT DOCUMENTS

| | | | | |
|---|---|---|---|---|
| 2017/0373829 | A1* | 12/2017 | Wurcker | H04L 9/002 |
| 2019/0268149 | A1* | 8/2019 | Kariv | H04L 9/0897 |
| 2019/0372765 | A1* | 12/2019 | Tegeder | H04L 9/085 |
| 2020/0119932 | A1* | 4/2020 | Cambou | H04L 9/0861 |
| 2023/0039723 | A1* | 2/2023 | Ichikawa | G06F 21/6227 |

OTHER PUBLICATIONS

Martin Burkhart et al., "Privacy-Preserying Distributed Network Troubleshooting-Bridging the Gap between Theory and Practice", ACM Transactions on Information and System Security, vol. 14, No. 4, Article 31, Publication date: Dec. 2011, total 30 pages.

"DAA—Max-Min Problem", Design and Analysis of Algorithms Max-Min Problem, 2018, total 3 pages.

Aseem Rastogi et al., "Wysteria: A Programming Language for Generic, Mixed-Mode Multiparty Computations", 2014 IEEE Symposium on Security and Privacy, May 2014, pp. 655-670, total 16 pages.

Daniel Demmler et al., "ABY—A Framework for Efficient Mixed-Protocol Secure Two-Party Computation", NDSS 2015, Feb. 8-11, 2015, total 15 pages, http://dx.doi.org/10.14722/ndss.2015.23113.

Ohata, "Round-Efficient Secure Two-Party Computation and Its Application to Privacy-Preserving Convolutional Neural Networks", Computer Security Symposium, Information Processing Society of Japan, Oct. 22-25, 2018, pp. 615-622 (16 pages including English Translation).

Ohata et al., "Communication-Efficient (Client-Aided) Secure Two-Party Protocols and Its Application", arXiv:1907.03415v2, Jan. 4, 2020, 30 pages.

Chida et al., "A Three-Party Secure Function Evaluation with Lightweight Verifiability Revisited", in CSS, 2010, 13 pages including English Translation.

Wagh et al., "SecureNN: 3-Party Secure Computation for Neural Network Training", Proceedings on Privacy Enhancing Technologies, vol. 1, No. 24, 2019, pp. 1-24.

* cited by examiner

SECRET MAXIMUM VALUE CALCULATION APPARATUS, METHOD AND PROGRAM

CROSS-REFERENCE TO RELATED APPLICATION

The present application is based on PCT filing PCT/JP2020/001545, filed Jan. 17, 2020, the entire contents of which are incorporated herein by reference.

TECHNICAL FIELD

The present disclosure relates to an encryption applied technique, and particularly to a method of computing a maximum value and a flag of a maximum value without revealing input or output.

BACKGROUND ART

There is a method called a secure computation as a method of obtaining a specific operation result without restoring encrypted numerical values (see, for example, NPL 1). In the method disclosed in NPL 1, an encryption in which fragments of numerical values are distributed among three secure computation apparatuses is performed and a coordinate computation is performed by the three secure computation apparatuses, and thus, without restoring the numerical value, it is possible to retain a state where results of addition/subtraction, constant addition, multiplication, constant multiplication, logical operations (negation, logical product, logical sum, exclusive logical sum), and data format conversion (integer, binary) are distributed among three secure computation apparatuses, i.e., an encrypted state. For computation of the maximum value of n values encrypted by the secure computation and the flag of the maximum value, there is a method in which the current maximum value and the number of the element of the maximum value are held as a cipher text, sequential comparison with n cipher texts is performed, the maximum value and the number of the element of the maximum value are updated, and finally the flag is computed from the number (for example see NPL 2).

CITATION LIST

Non Patent Literature

NPL 1 CHIDA KOJI, HAMADA KOKI, IKARASHI DAL TAKAHASHI KATSUMI, A Three-Party Secure Function Evaluation with Lightweight Verifiability Revisited, in CSS, 2010.

NPL 2 Sameer Wagh, Divya Gupta, and Nishanth Chandran, Securenn: 3-party secure computation for neural network training. Proceedings on Privacy Enhancing Technologies, Vol. 1, p. 24, 2019.

SUMMARY OF THE INVENTION

Technical Problem

In the known method; however, the number of comparison stages is as large as $\Theta(n)$ while the total number of comparisons for computing the maximum value is as large as $\Theta(n)$.

An object of the present disclosure is to provide a secure maximum value computation apparatus, a method, and a program whose processing time is reduced.

Means for Solving the Problem

A secure maximum value computation apparatus according to an aspect of the present disclosure, assuming that a set $X=\{[[x_1]], [[x_2]], \ldots, [[x_n]]\}$, includes an output unit that outputs and $[[x_1]]$ and $[[1]]$ as a maximum secret value $[[y]]$ and a flag $[[z(x_1)]]$, respectively, when $n=1$ holds, a comparison unit that computes comparison results of which is larger with respect to a predetermined order for every pairs $\{[[x_i]], [[x_j]]\} \subset X$ of elements of the X, a flag computation unit that computes whether all comparison results related to each of the $[[x_i]]$s are "large" for each of the $[[x_i]]$s to set a computed value as a flag $[[z(x_i)]]$, and a maximum value computation unit that uses the $[[z(x_i)]]$ to compute a maximum value $[[y]]$.

Effects of the Invention

The processing time can be reduced.

DESCRIPTION OF EMBODIMENTS

Figure 1:
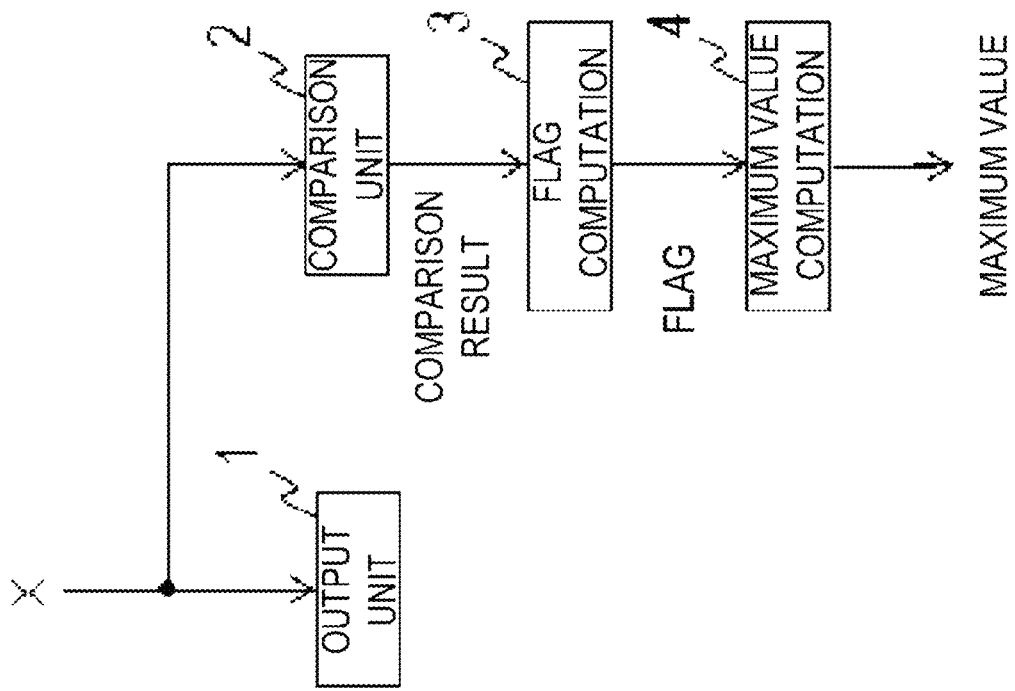
FIG. 1 is a diagram illustrating an example of a functional configuration of a secure maximum value computation apparatus of a first embodiment.

An embodiment of the present disclosure is elaborated below Note that in the drawings, the components with the same function are denoted with the same reference numeral, and overlapping description thereof is omitted.

Notation

A value of a certain value a hid by an encryption, secret sharing and the like is referred to as a secret value of a and represented as $[[a]]$. In the case where the hiding is performed by secret sharing, a set of fragments of the secret sharing beld by each secure computation apparatus according to the $[[a]]$is referenced. It is to be noted that because double brackets are typically used in patent amendments to delete the subject matter between the double brackets, the claims are written to use double parenthesis (()) and instead of the double brackets $[[]]$as used throughout the specification. Therefore, double parenthesis within the claims mean the same as double brackets described herein.

Decryption

Processing of computing a value c that meets c=a with an input of a secret value $[[a]]$ of a is described as follows.

$$c \leftarrow \text{Open}([[a]])$$

Arithmetic Operation

In operations of addition, subtraction and multiplication, secret values $[[c_1]]$, $[[c_2]]$ and $[[c_3]]$ of computation results $c_1$, $c_2$ and $c_3$ of a+b, a−b and ab, respectively, are computed with secret values $[[a]]$ and $[[b]]$ of two values a and b as inputs. Executions of these operations are described as follows.

$$[[c_1]] \leftarrow Add([[a]],[[b]])$$

$$[[c_2]] \leftarrow Sub([[a]],[[b]])$$

$$[[c_3]] \leftarrow Mul([[a]],[[b]])$$

In the case where there is no possibility of misunderstanding, Add($[[a]]$, $[[b]]$), Sub($[[a]]$, $[[b]]$) and Mul($[[a]]$, $[[b]]$) are abbreviated as $[[a]]+[[b]]$, $[[a]]-[[b]]$ and $[[a]]\times[[b]]$, respectively.

Comparison

In comparison operation, the secret values $[[c_1]]$, $[[c_2]]$ and $[[c_3]]$ of Boolean values $c \in \{0, 1\}$ of a=b, a≤b, a<b, respectively, are computed with the secret values $[[a]]$ and $[[b]]$ of the two values a and b as inputs. The Boolean value is 1 when true and 0 when false. Executions of these operations are described as follows.

$$[[c_0]] \leftarrow EQ([[a]],[[b]])$$

$$[[c_1]] \leftarrow LE([[a]],[[b]])$$

$$[[c_2]] \leftarrow LT([[a]],[[b]])$$

Note that at least one of the inputs of EQ. LE, and LT may not be a secret value.

Selection

In selection operation, with a secret value $[[c]]$ of a Boolean value $c \in \{0, 1\}$ and the secret values $[[a]]$ and $[[b]]$ of two values a and b as inputs, and $$d = \begin{cases} a & \text{if } c = 1, \\ b & \text{otherwise}, \end{cases} \quad [\text{Math 1}]$$

a secret value $[[d]]$ that meets Math 1 is computed. Execution of the above operation is described as follows.

$$[[d]] \leftarrow IfElse([[c]],[[a]],[[b]])$$

The above operation can be achieved by the following.

$$[[d]] \leftarrow [[c]] \times ([[a]]-[[b]])+[[b]]$$

First Embodiment

A secure maximum value computation apparatus and a method of the first embodiment are a secure maximum value computation apparatus and a method for performing, from a set of secret values $X=\{[[x_1]], [[x_2]], \ldots, [[x_n]]\}$, a computation of a maximum secret value $[[y]]$ with respect to a preliminarily set order and a secret value $[[z(x_i)]]$ of a flag indicating whether each secret value is maximum.

The notation of the input, output and processing of the secure maximum value computation apparatus and the method of the first embodiment may be described as follows.

Input: $X=\{[[x_1]], \ldots, [[x_na]]\}$

Output: $[[y]], [[z(x_1)]], \ldots, [[z(x_n)]]$

Notation: $[[y]], [[z(x_1)]], \ldots, [[z(x_n)]] \leftarrow f_0([[x_1]], \ldots, [[x_n]])$ As illustrated in FIG. 1, the secure maximum value computation apparatus of the first embodiment includes, for example, an output unit 1, a comparison unit 2, a flag computation unit 3, and a maximum value computation unit 4.

Figure 2:
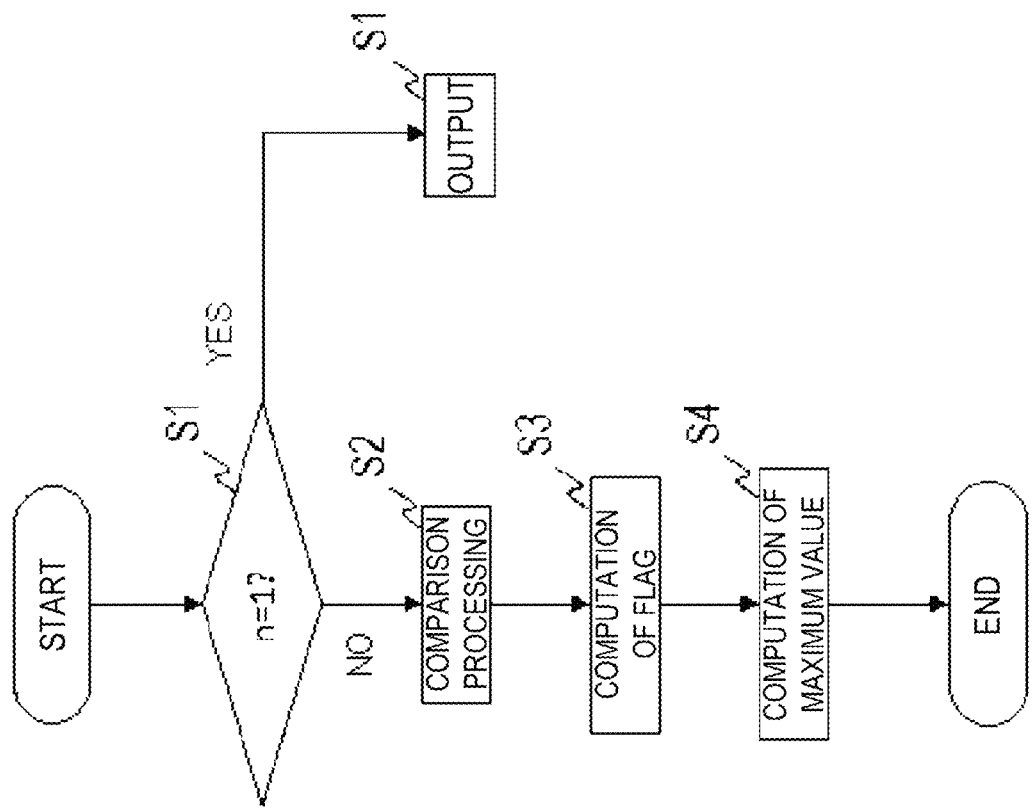
FIG. 2 is a diagram illustrating an example of a processing procedure of a secure maximum value computation method of the first embodiment.

The secure maximum value computation method is achieved when the components of the secure maximum value computation apparatus perform the processing operations of steps S1 to S4 described below and illustrated in FIG. 2, for example.

Each component of the secure maximum value computation apparatus is described below.

Output Unit 1

A set $X=\{[[x_1]], [[x_2]], \ldots, [[x_n]]\}$ is input to the output unit 1. The n is a predetermined positive integer.

In the case of n=1, the output unit 1 outputs $[[x_1]]$ and $[[1]]$ as the maximum secret value $[[y]]$ and the flag $[[z(x_1)]]$, respectively (step S1).

In the case where n=1 does not hold, the processing operations of the following step S2 and the subsequent steps are performed.

Comparison Unit 2

A set $X=\{[[x_1]], [[x_2]], \ldots, [[x_n]]\}$ is input to the comparison unit 2.

The comparison unit 2 computes a comparison result of which is larger with respect to the predetermined order for each pair $\{[[x_i]], [[x_j]]\} \subset X$ of the elements of X (step S2).

The computed comparison result is output to the flag computation unit 3.

For example, the comparison unit 2 performs a computation of $[[c_{i,j}]] \leftarrow LE([[x_i]], [[x_j]])$ for each $1 \leq i \leq j \leq n$. In other words, the comparison unit 2 performs a computation of $LE(x_i, x_j)$ for each (i, j) (i, j∈[1, n], i<j), and sets a computation result $[[c_{i,j}]]$ as a comparison result.

Here, $LE(x_i, x_j)$ is a function that outputs $[[1]]$ when $x_i \leq x_j$ holds, and outputs $[[0]]$ when $x_i \leq x_j$ does not hold.

Flag Computation Unit 3

The comparison result computed at the comparison unit 2 is input to the flag computation unit 3.

The flag computation unit 3 performs a computation about whether all comparison results related to each $[[x_i]]$ are "large" for each $[[x_i]]$, and sets a computed value as a flag $[[z(x_i)]]$ (step S3).

The computed flag $[[z(x_i)]]$ is output to the maximum value computation unit 4.

For example, the flag computation unit 3 performs a computation of $1-[[c_{j,i}]]$ for each (i, j) (i, j∈[1, n], i>j), and sets a computation result as $[[c_{i,j}]]$. The flag computation unit 3 performs a computation of $\Pi_{i \neq j}[[c_{i,j}]]$ for each i, and sets a computation result as a flag $[[z(x_i)]]$.

In addition, the flag computation unit 3 performs a computation of $1-[[c_{j,i}]]$ for each (i, j) (i, j∈[1, n], i>j), and sets a computation result as $[[c_{i,j}]]$. The flag computation unit 3 may perform a computation of $[[z(x_i)]] \leftarrow EQ(\Sigma_{i \neq j}[[c_{i,j}]], n-1)$ for each i, and set a computation result as a flag $[[z(x_i)]]$. Note that n−1 compared by the function EQ may be a secret value. That is, the flag computation unit 3 may perform a computation of $[[z(x_i)]] \leftarrow EQ(\Sigma_{i \neq j}[[c_{i,j}]], [[n-1]])$ for each i, and set a computation result as a flag $[[z(x_i)]]$.

Here, the $EQ([[a]], [[b]])$ is a function that outputs $[[1]]$ when a=b holds and outputs $[[0]]$ when a=b does not hold.

Maximum Value Computation Unit 4

The flag $[[z(x_i)]]$ computed at the flag computation unit 3 is input to the maximum value computation unit 4.

The maximum value computation unit 4 computes a maximum value $[[y]]$ by using $[[z(x_i)]]$ (step S4).

For example, the maximum value computation unit 4 computes $\Sigma_{i\in[1,\ n]}([[x_i]]\times[[z(x_i)]]$, and sets a computation result as a maximum value $[[y]]$.

In a known method, the maximum value is sequentially updated from a set of secret values while maintaining the maximum value, and as such the number of comparison stages is $\Theta(n)$. Conversely, according to the first embodiment, the number of comparison stages can be set to one by performing the comparison at once. In this manner, the processing time of the computation of a secret value of a maximum value and a secret value of a flag indicating whether it is the maximum value from a set of secret values with a size n can be reduced.

Second Embodiment

A secure maximum value computation apparatus and a method of a second embodiment are a secure maximum value computation apparatus and a method for performing, from a set of secret values $X=\{[[x_1]], [[x_2]], \ldots, [[x_n]]\}$, a computation of the maximum secret value $[[y]]$ with respect to a preliminarily set order and a computation of a secret value $[[z(x_i)]]$ of a flag indicating whether each secret value is may in two comparison stages.

The notation of the input, output and processing of the secure maximum value computation apparatus and the method of the second embodiment may be described as follows.

Input: $X=\{[[x_1]], \ldots, [[x_n]]\}$

Output: $[[y]],[[z(x_1)]], \ldots, [[z(x_n)]]$

Figure 3:
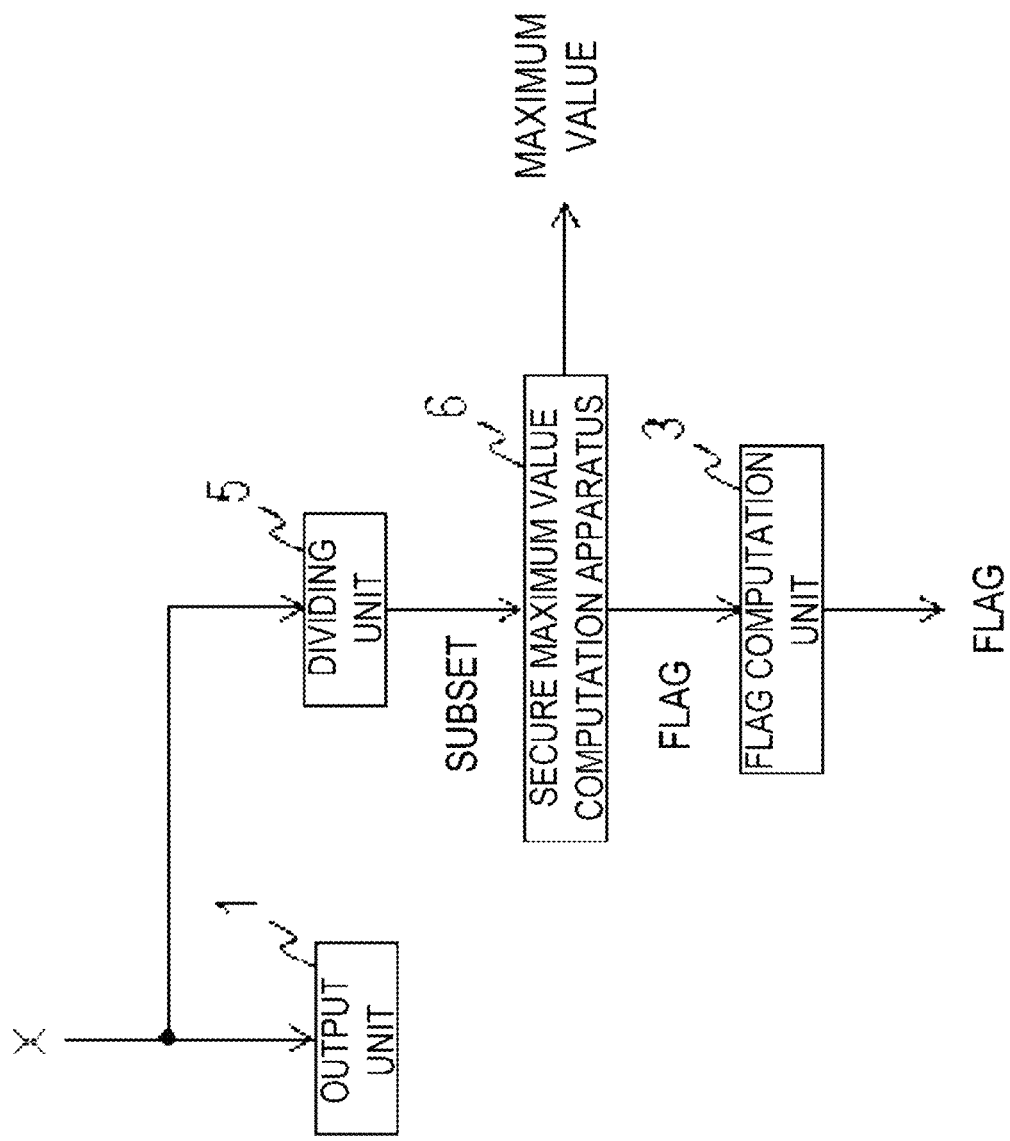
FIG. 3 is a diagram illustrating an example of a functional configuration of a secure maximum value computation apparatus of a second embodiment.

Notation: $[[y]],[[z(x_1)]], \ldots, [[z(x_n)]]\leftarrow f_1([[x_1]], \ldots, [[x_n]])$ As illustrated in FIG. 3, the secure maximum value computation apparatus of the second embodiment includes the output unit 1, a dividing unit 5, a secure maximum value computation apparatus 6, and the flag computation unit 3, for example.

Figure 4:
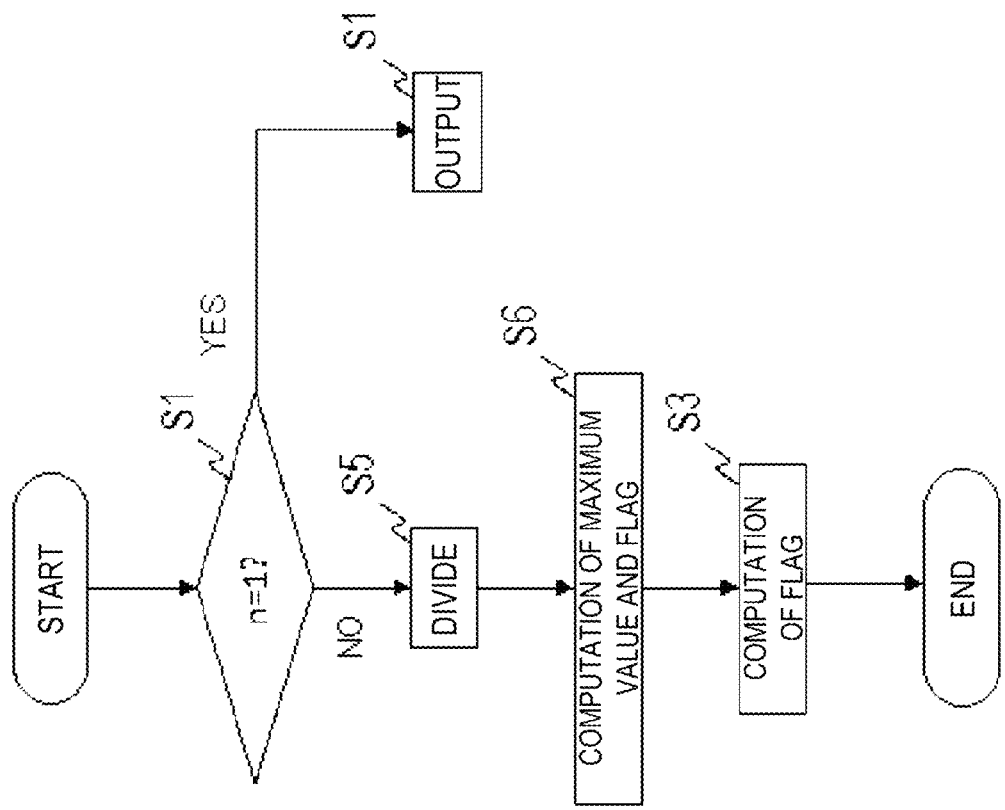
FIG. 4 is a diagram illustrating an example of a processing procedure of a secure maximum value computation method of the second embodiment.

The secure maximum value computation method is achieved when the components of the secure maximum value computation apparatus perform the processing operations of steps S1 to S3 described below and illustrated in FIG. 4, for example.

Each component of the secure maximum value computation apparatus is described below.

Output Unit 1

A set $X=\{[[x_1]], [[x_2]], \ldots, [[x_n]]\}$ is input to the output unit 1. The ii is a predetermined positive integer.

In the case of n=1, the output unit 1 outputs $[[x_1]]$ and $[[1]]$ as the maximum secret value $[[y]]$ and the flag $[[z(x_1)]]$, respectively (step S1).

When n=1 does not hold, the processing operations of the following step S5 and the subsequent steps are performed.

Dividing Unit 5

A set $X=\{[[x_1]], [[x_2]], \ldots, [[x_n]]\}$ is input to the dividing unit 5.

The dividing unit 5 divides the X into two or more subsets (step S5).

The obtained two or more subsets are output to the secure maximum value computation apparatus 6.

For example, the dividing unit 5 divides the X into $\Theta(n^{2/3})$ subsets with substantially the same number of elements. More specifically, the dividing unit 5 divides the X into $\lceil n^{2/3} \rceil$ subsets $X_1, \ldots, X_L$. $\lceil n^{2/3} \rceil$ is a minimum integer equal to or greater than $n^{2/3}$. Here, $(|X_i|\geq 1(i\in[1,L])$, $\cup_{i\in[1,L]}X_i=X$, and $X_i\cap X_j=\varphi(i\neq j)$ hold. For example, the dividing unit 5 sets $X_i=\{[[x_{s\_(i-1)}]], \ldots, [[x_{s\_i-1}]]\}$ $(i\in[1,L])$ for $s_i$ $(i\in[0,L])$ that sets $1=s_0<s_1<\ldots<s_L=n+1$. Here, a subscript s_(i-1) of the x means $s_{i-1}$. In addition, a subscript s_i-1 of the x means $s_i-1$.

Secure Maximum Value Computation Apparatus 6

The two or more subsets obtained by the dividing unit 5 are input to the secure maximum value computation apparatus 6.

The secure maximum value computation apparatus 6 performs processing for each of the two or more subsets and computes a secret value of a maximum value and a flag corresponding to each subset. Further, the secure maximum value computation apparatus 6 performs processing on a set of maximum values corresponding to each subset and computes the maximum value $[[y]]$, and a flag for each subset (step S6).

The secure maximum value computation apparatus 6 is the secure maximum value computation apparatus of the first embodiment. With use of the notation of the secure maximum value computation apparatus of the first embodiment, the processing of the secure maximum value computation apparatus 6 may be described as follows.

$$[[y_i]],[[z(x_{s\_(i-1)})]], \ldots, [[z(x_{s\_i-1})]]\leftarrow f_0([[x_{s\_(i-1)}]], \ldots, [[x_{s\_i-1}]])(i\in[1,L])$$

$$[[y]],[[z(y_1)]], \ldots, [[z(y_L)]]\leftarrow f_0([[y_1]], \ldots, [[y_L]])$$

That is, the secure maximum value computation apparatus 6 performs, on $i\in[1, L]$, processing of outputting $[[y_i]]$ and $[[z(x_{s\_(i-1)})]], \ldots, [[z(x_{s\_i-1})]]$, with an input of $X=[[x_{s\_(i-1)}]], \ldots, [[x_{S\_i-1}]]$, and performs processing of outputting $[[y]]$ and $[[z(y_1)]], \ldots, [[z(y_L)]]$, with an input of $[[y_1]], \ldots, [[y_L]]$.

The secret value $[[y_i]]$ of the maximum value and the flag $[[z(x_{s\_(i-1)})]], \ldots, [[z(x_{s\_i-1})]]$ corresponding to each subset i obtained through the computation, and the maximum value $[[y]]$, and the flag $[[z(y_1)]], \ldots [[z(y_L)]]$ for each subset obtained through the computation are output to the flag computation unit 3.

Flag Computation Unit 3

The flag $[[z(x_{s\_(i-1)})]], \ldots, [[z(x_{s\_i-1})]]$ and flag $[[z(y_1)]], \ldots, [[z(y_L)]]$ computed by the secure maximum value computation apparatus 6 are input to the flag computation unit 3.

The flag computation unit 3 computes a flag obtained by multiplying the computed flag by the flag of each subset (step S3).

For example, for each $i\in[1, L]$, the flag computation unit 3 performs processing of $[[z(x_j)]]\leftarrow [[z(x_j)]]\times[[z(y_i)]]$ $(j\in[s_{i-1}, s_i-1])$.

With the secure maximum value computation apparatus and the method of the second embodiment, the total number of times of the comparison can be set to $\Theta(n^{4/3})$ times although the number of comparison stages is two. In this manner, the processing time of the computation of a secret value of a maximum value and a secret value of a flag indicating whether it is the maximum value from a set of secret values with a size n can be reduced.

Third Embodiment

A secure maximum value computation apparatus and a method of a third embodiment are a secure maximum value computation apparatus and a method for performing, from a set of secret values $X=\{[[x_1]], [[x_2]], \ldots, [[x_n]]\}$, a computation of the maximum secret value $[[y]]$ with respect to a preliminarily se order and a computation of a secret value $[[z(x_i)]]$ of a flag indicating whether each secret value is maximum in k+1 comparison stages.

The notation of the input, output and processing of the secure maximum value computation apparatus and the method of the third embodiment may be as follows. In a case of k=1, it coincides with the description of the second embodiment.

Input: $X=\{[[x_1]], \ldots, [[x_n]]\}$

Output: $[[y]], [[z(x_1)]], \ldots, [[z(x_n)]]$

Figure 5:
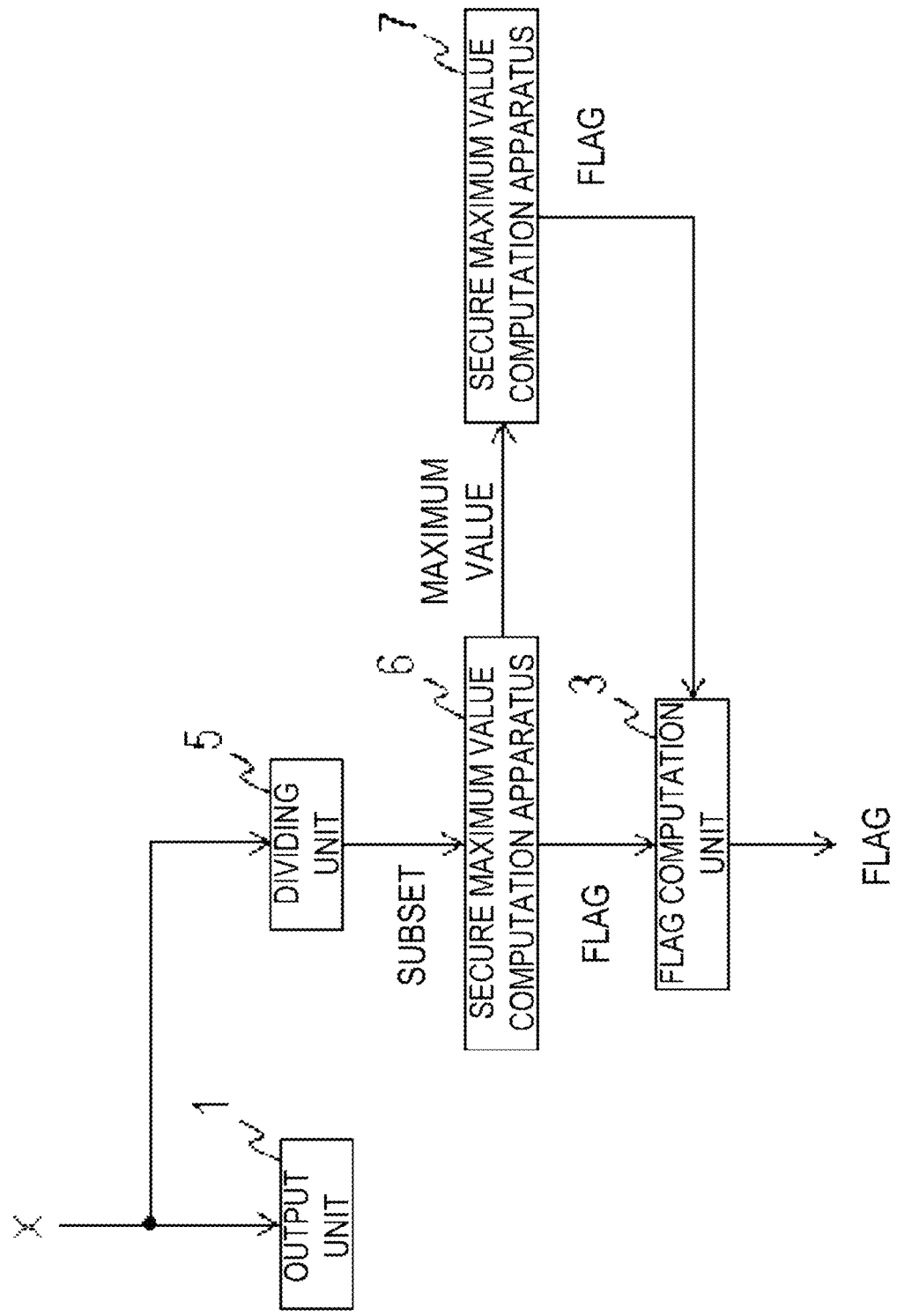
FIG. 5 is a diagram illustrating an example of a functional configuration of a secure maximum value computation apparatus of a third embodiment.

Notation: $[[y]], [[z(x_1)]], \ldots, [[z(x_n)]] \leftarrow f_k([[x_1]], \ldots, [[x_n]])$ As illustrated in FIG. 5, the secure maximum value computation apparatus of the third embodiment includes the output unit 1, the dividing unit 5, the secure maximum value computation apparatus 6, a secure maximum value computation apparatus 7 and the flag computation unit 3, for example.

Figure 6:
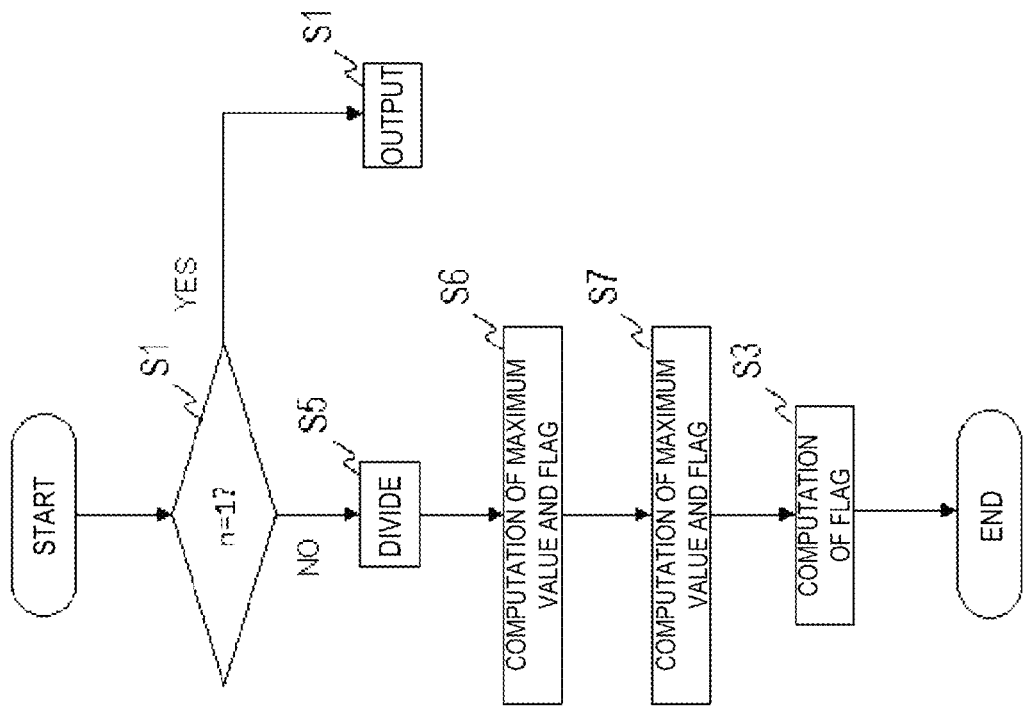
FIG. 6 is a diagram illustrating an example of a processing procedure of a secure maximum value computation method of the third embodiment.

The secure maximum value computation method is achieved when the components of the secure maximum value computation apparatus perform the processing operations of steps S1 to S3 described below and illustrated in FIG. 6, for example.

Each component of the secure maximum value computation apparatus is described below.

Output Unit 1

A set $X=\{[[x_1]], [[x_2]], \ldots, [[x_n]]\}$ is input to the output unit 1. The n is a predetermined positive integer.

In the case of n=1, the output unit 1 outputs $[[x_1]]$ and $[[1]]$ as the maximum secret value $[[y]]$ and the flag $[[z(x_1)]]$, respectively (step S1).

When n=1 does not hold, the processing operations of the following step S5 and the subsequent steps are performed.

Dividing Unit 5

A set $X=\{[[x_1]], [[x_2]], \ldots, [[x_n]]\}$ is input to the dividing unit 5.

The dividing unit 5 divides the X into two or more subsets (step S5).

The obtained two or more subsets are output to the secure maximum value computation apparatus 6.

For example, the X is divided into $L=\lceil n^{\wedge}(2 k/(2^{k+1}-1)) \rceil$ subsets $X_1, \ldots, X_L$. $\lceil n^{\wedge}(2 k/(2^{k+1}-1)) \rceil$ is a minimum integer equal to or greater than $n^{\wedge}(2 k/(2^{k+1}-1))$. Here, $(|X_i| \geq 1 (i \in [1, L])$, $\cup_{i \in [1, L]} X_i = X$, and $X_i \cap X_j = \varphi$ $(i \neq j)$ hold. For example, the dividing unit 5 sets $X_i = \{[[x_{s\_(i-1)}]], \ldots, [[x_{s\_i-1}]]\}$ $(i \in [1, L])$ for $s_i$ $(i \in [0, L])$ that sets $1 = s_0 < s_1 < \ldots < s_L = n+1$. Here, a subscript s_(i-1) of the x means $s_{i-1}$. In addition, a subscript s_i-1 of the x means $s_i - 1$.

In this manner, in the m-th recursion, the X is divided into $n^{\wedge}(2^{k+1-m}/(2^{2+2-m}-1))$ subsets with substantially the same number of elements.

Secure Maximum Value Computation Apparatus 6

The two or more subsets obtained by the dividing unit 5 are input to the secure maximum value computation apparatus 6.

The secure maximum value computation apparatus 6 performs processing for each of the two or more subsets and computes a secret value of a maximum value and a flag corresponding to each subset (step S6).

The secure maximum value computation apparatus 6 is the secure maximum value computation apparatus of the third embodiment. With use of the notation of the secure maximum value computation apparatus of the third embodiment, the process of the secure maximum value computation apparatus 6 may be described as follows. In this manner, the secure maximum value computation apparatus of the third embodiment recursively performs the processing.

$[[y_i]], [[z(x_{s\_(i-1)})]], \ldots, [[z(x_{s\_i-1})]] f_{k-1}([[x_{s\_(i-1)}]], \ldots, [[x_{s\_i-1}]]) (i \in [1, L])$ That is, the secure maximum value computation apparatus 6 performs, on $i \in [1, L]$, processing of outputting $[[y_1]]$ and $[[z(x_{s\_(i-1)})]], \ldots, [[z(x_{s\_i-1})]]$, with an input of $X=[[x_{s\_(i-1)}]], \ldots, [[x_{s\_i-1}]]$.

The secret value $[[y_i]]$ of the maximum value and the flag $[[z(x_{s\_(i-1)})]], \ldots, [[z(x_{s\_(i-1)})]]$ corresponding to each subset i obtained through the computation are output to the secure maximum value computation apparatus 7.

Secure Maximum Value Computation Apparatus 7

The secret value $[[y_i]]$ of the maximum value and the flag $[[z(x_{s\_(i-1)})]], \ldots, [[z(x_{s\_i-1})]]$ corresponding to each subset i obtained through the computation at the secure maximum value computation apparatus 6 are input to the secure maximum value computation apparatus 7.

The secure maximum value computation apparatus 7 perforans processing on a set of maximum values corresponding to each subset and computes the maximum value $[[y]]$, and a flag for each subset (step S7).

The secure maximum value computation apparatus 7 is the secure maximum value computation apparatus of the first embodiment. With use of the notation of the secure maximum value computation apparatus of the first embodiment, the processing of the secure maximum value computation apparatus 7 may be described as follows.

$[[y]], [[z(y_1)]], \ldots, [[z(y_L)]] \leftarrow f_0([[y_1]], \ldots, [[y_L]])$ That is, the secure maximum value computation apparatus 7 performs processing of outputting $[[y]]$ and $[[z(y_1)]], \ldots, [[z(y_L)]]$, with an input of $[[y_1]], \ldots [[y_L]]$.

The flag $[[z(y_1)]], \ldots, [[z(y_L)]]$ for each subset obtained through the computation is output to the flag computation unit 3.

Flag Computation Unit 3

The flag $[[z(x_{s\_(i-1)})]], \ldots, [[z(x_{s\_i-1})]]$ computed by the secure maximum value computation apparatus 6 and the flag $[[z(y_1)]], \ldots, [[z(y_L)]]$ computed by the secure maximum value computation apparatus 7 are input to the flag computation unit 3.

The flag computation unit 3 computes a flag obtained by multiplying the computed flag by the flag of each subset (step S3).

For example, for each $i \in [1, L]$, the flag computation unit 3 performs processing of $[[z(x_j)]] \leftarrow [[z(x_j)]] \times [[x(y_i)]]$ $(j \in [s_{i-1}, s_i - 1])$.

With the secure maximum value computation apparatus and the method of the third embodiment, the total number of times of the comparison can be set to $\Theta(n^{\wedge}(1+1/(2^{k+1}-1)))$ times although the number of comparison stages is k+1. In this manner, the processing time of the computation of a secret value of a maximum value and a secret value of a flag indicating whether it is the maximum value from a set of secret values with a size n can be reduced.

Modified Examples

Although the embodiments of the present disclosure have been described above, a specific configuration is not limited to the embodiments, the present disclosure, of course, also includes configurations appropriately changed in the design without departing from the gist of the present disclosure.

The various kinds of processing described in the embodiments are not only implemented in the described order in a time-series manner but may also be implemented in parallel or separately as necessary or in accordance with a processing capability of the apparatus which performs the processing.

For example, the exchange of data between the components of the secure maximum value computation apparatus may be performed directly or via a storage unit not illustrated.

Program and Recording Medium

Figure 7:
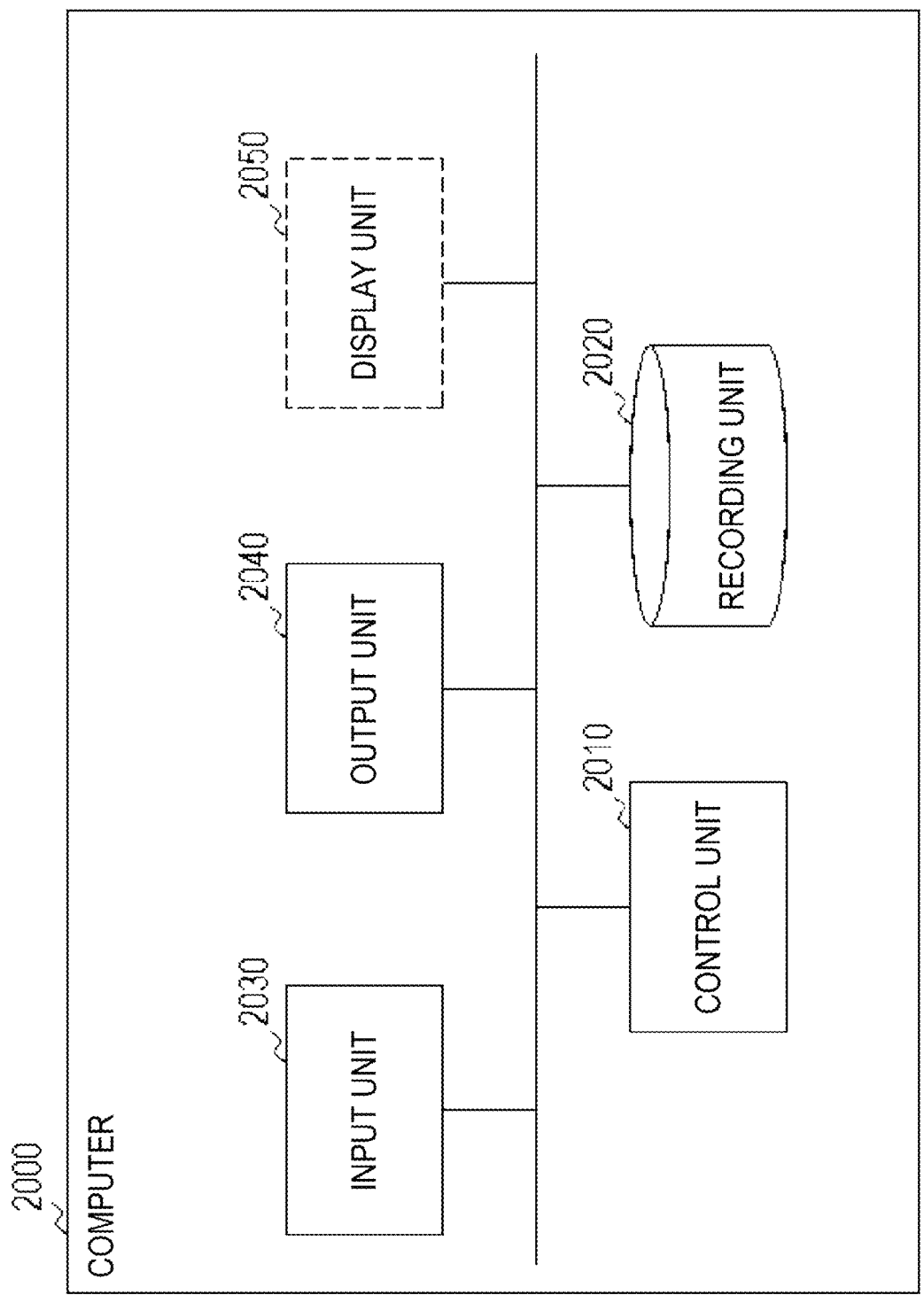
FIG. 7 is a diagram illustrating an example of a functional configuration of a computer.

When various processing functions in the devices described above are implemented by a computer, processing details of the functions that each of the devices should have are described by a program. In addition, when the program is executed by the computer, the various processing functions of each device described above are implemented on the computer. For example, a variety of processing described above can be performed by causing a recording unit 2020 of the computer illustrated in FIG. 7 to read a program to be executed and causing a control unit 2010, an input unit 2030, an output unit 2040, and the like to execute the program.

The program in which the processing details are described can be recorded on a computer-readable recording medium. The computer-readable recording medium, for example, may be any type of medium such as a magnetic recording device, an optical disc, a magneto-optical recording medium, or a semiconductor memory.

In addition, the program is distributed, for example, by selling, transferring, or lending a portable recording medium such as a DVD or a CD-ROM with the program recorded on it. Further, the program may be stored in a storage device of a server computer and transmitted from the server computer to another computer via a network, so that the program is distributed.

For example, a computer executing the program first temporarily stores the program recorded on the portable recording medium or the program transmitted from the server computer in its own storage device. When executing the processing, the computer reads the program stored in its own storage device and executes the processing in accordance with the read program. Further, as another execution form of this program, the computer may directly read the program from the portable recording medium and execute processing in accordance with the program, or, further, may sequentially execute the processing in accordance with the received program each time the program is transferred from the server computer to the computer, in addition, it can also be configured to execute the processing described above through a so-called application service provider (ASP) type service in which processing functions are implemented just by issuing an instruction to execute the program and obtaining results without transmitting the program from the server computer to the computer. Further, the program in this form is assumed to include information which is provided for processing of a computer and is equivalent to a program (data or the like that has characteristics of defining the processing of the computer rather than being a direct instruction to the computer).

In addition, although the device is configured by executing a predetermined program on a computer in this form, at least a part of the processing details may be implemented by hardware.

REFERENCE SIGNS LIST

1 Output unit
2 Comparison unit
3 Flag computation unit
4 Maximum value computation unit
5 Dividing unit
6 Secure maximum value computation apparatus
7 Secure maximum value computation apparatus

The invention claimed is:

1. A secure maximum value computation apparatus for a set of secret values $X=\{((x_1)), ((x_2)), \ldots, ((x_n))\}$ where n is a positive integer, the secure maximum value computation apparatus comprising:
   output circuitry configured to output $((x_1))$ and $((1))$ as a maximum secret value $((y))$ and a flag $((z(x_1)))$, respectively, when n=1;
   comparison circuitry configured to compute comparison results of which is larger with respect to a predetermined order for every pairs $\{((x_i)), ((x_j))\} \subset X$ of elements of the set of secret values X, where $1 \leq i \leq j \leq n$;
   flag computation circuitry configured to compute whether all comparison results related to each of the $((x_i))$s are "large" for each of the $((x_i))$s to set a computed value as a flag $((z(x_i)))$; and
   maximum value computation circuitry configured to use the $((z(x_i)))$ to compute a maximum value $((y))$, wherein
   in a case that a function $LE(x_i, x_j)$ outputs $((1))$ when $x_i x_j$ and outputs $((0))$ when $x_j > x_i$, the comparison circuitry performs computations of $LE(x_i, x_j)$ for every (i, j)s $(i, j \in [1, n], i < j)$ to set computation results $((c_{i,j}))$s as the comparison results,
   a and b are inputs, and
   in a case that a function $EQ(((a)), ((b)))$ outputs $((1))$ when a=b and outputs $((0))$ when a≠b, the flag computation circuitry:
   performs computations of $1-((c_{j,i}))$ for every (i, j)s $(i, j \in [1, n], i > j)$ to set computation results as $((c_{i,j}))$s, and
   performs a computation of $((z(x_i))) \leftarrow EQ(\Sigma_{i \neq j}((c_{i,j})), n-1)$ for each i to set a computation result as a flag $((z(x_i)))$.

2. The secure maximum value computation apparatus according to claim 1, wherein the maximum value computation circuitry computes $\Sigma_{i \in [1, n]}((x_i)) \times ((z(x_i)))$ to set a computation result as the maximum value $((y))$.

3. The secure maximum value computation apparatus according to claim 1, wherein the flag computation performs computations of $1-((c_{j,i}))$ for every (i, j)s $(i, j \in [1, n], i > j)$ to set computation results as $(c_{i,j})$s and performs a computation of $\Pi_{i \neq j}((c_{i,j}))$ for each i to set a computation result as a flag $((z(x_i)))$.

4. A secure maximum value computation apparatus for a set of secret values $X=\{((x_1)), ((x_2)), \ldots, ((x_n))\}$, wherein n is positive integer, the secure maximum value computation apparatus comprising:
   output circuitry configured to output $((x_1))$ and $((1))$ as a maximum value $((y))$ and a flag $((z(x_1)))$, respectively, when n=1;
   flag computation circuitry configured to compute whether all comparison results related to each of the $((x_i))$s are "large" for each of the $((x_i))$ s to set a computed value as a flag $((Z(X_i)))$;
   comparison circuitry configured to compute comparison results of which is larger with respect to a predetermined order for every pairs $\{((x_i)), ((x_j))\} \subset X$ of elements of the set of secret values X, where $1 \leq i \leq j \leq n$;
   maximum value computation circuitry configured to use the $((z(x_i)))$ to compute a maximum value $((y))$; and
   dividing circuitry configured to divide X into two or more subsets, wherein;

the secure maximum value computation apparatus is configured to perform processing on each of the two or more subsets to compute a secret value of a maximum value and a flag corresponding to each of the two or more subsets and perform processing on a set of maximum values corresponding to the two or more subsets to compute a maximum value $((y))$ and the flag for each of the two or more subsets; and flag computation circuitry configured to compute a flag obtained by multiplying the flag computed for each of the two or more subsets with each other.

5. A secure maximum value computation apparatus for a set of secret values $X=\{((x_1), ((x_2)), \ldots, ((x_n))\}$, wherein n is a positive integer, the secure maximum value computation apparatus comprising:

output circuitry configured to output $((x_1))$ and $((1))$ as a maximum secret value $((y))$ and a flag $((z(x_1)))$, respectively, when n=1 holds;

comparison circuitry configured to compute comparison results of which is larger with respect to a predetermined order for every pairs $\{((x_i)), ((x_j))\} \subset X$ of elements of the set of secret values X, where $1 \leq i \leq j \leq n$;

flag computation circuitry configured to compute whether all comparison results related to each of the $((x_i))$s are "large" for each of the $((x_i))$s to set a computed value as a flag $((z(x_i)))$;

maximum value computation circuitry configured to use the $((z(x_i)))$ to compute a maximum value $((y))$; and dividing circuitry configured to divide X into two or more subsets, wherein the secure maximum value computation apparatus performs processing on each of the two or more subsets to compute a secret value of a maximum value and a flag corresponding to each of the two or more subsets, and the secure maximum value computation apparatus further includes processing circuitry configured to perform processing on a set of maximum values corresponding to the two or more) subsets to compute the maximum value $((y))$ and the flag for each of the two or more subsets; and compute a flag by multiplying the flag computed for each of the two or more subsets with each other.

\* \* \* \* \*